Figures 1, 2:
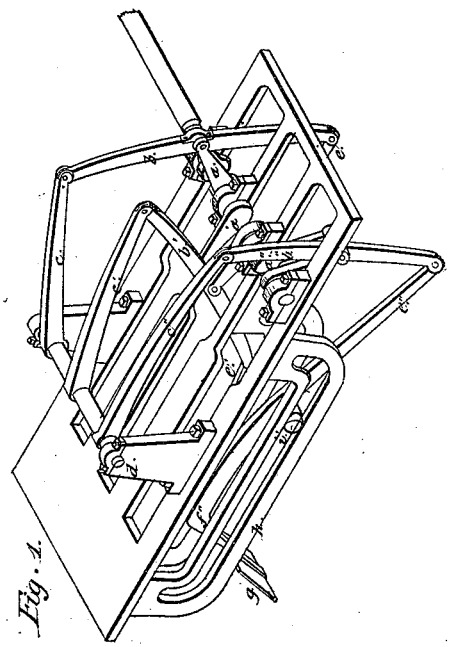

M. A. Crooker.
Crank Paddle.
N° 9,066.          Patented Jun. 29, 1852.

UNITED STATES PATENT OFFICE.

MATTHEW AUGUSTUS CROOKER, OF NEW YORK, N. Y.

APPARATUS FOR PROPELLING VESSELS.

Specification forming part of Letters Patent No. 9,066, dated June 29, 1852.

*To all whom it may concern:*

Be it known that I, MATTHEW AUGUSTUS CROOKER, of the city, county, and State of New York, have invented certain new and useful Improvements in Paddles for the Propulsion of Vessels; and I do hereby declare that the following is a full, clear, and exact description of the same, reference being made to the annexed drawings, making a part of this specification, in which—

Figure I is a view in perspective. Fig. II is an elevation of my invention.

Similar letters refer to similar parts throughout.

The principle aimed at by me in this invention is to produce a movement somewhat in imitation of that employed in nature by aquatic birds for their propulsion, as ducks, geese, &c. In place of the contraction of the paddle to represent the movement of the foot, the former is lifted from the water, but the act of propelling is sought to be the same, and is as follows:

In Fig. I is a perspective view of a portion of the guard of a vessel having the propelling arrangement attached, and Fig. II is a side elevation of the same with a diagram tracing the path of the paddle during one revolution of the crank-shaft. In the floor of the guard are three longitudinal openings or more, according to the number of paddles and cranks. The main shaft passes through the side of the vessel, and has affixed to it three cranks, as seen at $a$ $a'$ $a''$. These cranks are arranged to form three equal angles as respects each other, by which means one paddle is always in the water. A lever of the third class is next affixed to each crank, as seen at $b$ $b'$ $b''$. The fulcra of these are the ends of three arms $c$ $c'$ $c''$, having an axis upon a cross-bar $d$, supported by the uprights seen upon each side of the guard. Beneath the guard the paddles are arranged upon levers supported upon moving fulcra which slide in guides parallel to the line of motion of the boat. These levers are seen at $e$ $e'$ $e''$, one to each of the vertical levers $b$, to which they are fastened at the lower ends, as shown. The opposite end of each of these horizontal levers is bent down at right angles, or nearly so, as shown at $f$, and the paddle $g$ is attached by bolts or otherwise.

At $h$ is a series of guides to support the levers $e$ upon the fulcrum $i$. A guide is placed upon each side of the lever, and the pin constituting the fulcrum extends across, one end resting upon each, and to diminish friction rollers are put upon the pins to run upon the guides.

The operation is as follows: Rotary motion being given to the main shaft, the cranks transmit the motion to the paddles through the intervention of the levers, by which means the paddles are made to describe a series of irregular curves, being figures compounded of the circular motion of the cranks with the angular throw of the levers. As the form of the irregular figure described by the paddle may be greatly varied by the length of the levers and the positions of their fulcra, I have found that one of the best arrangements consists in connecting the vertical levers with the cranks at a point equidistant from the ends of those levers and placing the fulcra of the horizontal levers also equidistant from their ends. This gives to the paddle a direct horizontal motion during its immersion in the water, with a sudden curve at leaving and entering, and a constantly-rising one during the time of its track through the air to renew its stroke upon the water, which is clearly shown in the dotted lines in Fig. II. In addition to this, the vibratory motion of the horizontal lever $e$ gives to the position of the paddles various angles during their rotation, whereby a movement is produced similar to that known as "feathering" during the operation of rowing by manual power. In Fig. II are seen the several angles assumed by the paddles in the different positions of crank and levers. Thus while the paddle is in the water it is vertical to produce the greatest resistance. As it leaves it inclines forward, by which position it is, as it were, withdrawn from the water, thus leaving it with the least disturbance, and again entering it in like manner. Hence the greatest mechanical effect is produced with the least loss of power.

In addition to the angular positions of the paddles in the different parts of their revolution, which, as has been described, effects the horizontal and feathering movements, the guides $h$ can also be shaped to modify still further the motion of the paddle. This formation is used to accelerate the motion at the moment the paddle is about to leave or enter the water, and it is obvious that there is an advantage in accomplishing this as soon as possible. To effect this the groove $h$, forming the slide, after proceeding horizontally for a greater part of the stroke, is rounded up at each end, as shown in the drawings. The fulcrum $i$ reaches this curve just before the termination of the stroke and just when one of the cranks, being near its lowest point, has thrown down one of the vertical levers $b$, projecting with it the attached end of the horizontal lever $e$. At this moment the fulcrum-pin $i$ enters the curve in the guide, and this upward movement of the fulcrum, being in addition to the regular movement of the lever, causes the accelerated motion described. The entering motion is effected in the same manner.

What I claim as of my own invention, and desire to secure by Letters Patent, is—

The combination of the radius-bars, upright levers, cranks, horizontal levers carrying paddles, and curved slots arranged with respect to each other and connected and operating substantially in the manner set forth herein.

MATTHEW AUGUSTUS CROOKER.

Witnesses:
S. H. MAYNARD,
C. G. HAYES.